United States Patent
Ucar et al.

(10) Patent No.: US 11,638,131 B2
(45) Date of Patent: Apr. 25, 2023

(54) DYNAMIC ADJUSTMENT OF VEHICULAR MICRO CLOUD PROPERTIES

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 236 days.

(21) Appl. No.: 17/004,471

(22) Filed: Aug. 27, 2020

(65) Prior Publication Data

US 2022/0070634 A1    Mar. 3, 2022

(51) Int. Cl.
*H04W 4/40* (2018.01)
*H04W 84/18* (2009.01)

(52) U.S. Cl.
CPC .............. *H04W 4/40* (2018.02); *H04W 84/18* (2013.01)

(58) Field of Classification Search
CPC ................................ H04W 4/40; H04W 84/18
See application file for complete search history.

(56) References Cited

U.S. PATENT DOCUMENTS

| 10,334,405 B2 | 6/2019 | Altintas et al. |
| 10,567,923 B2 | 2/2020 | Gade et al. |
| 10,587,998 B2 | 3/2020 | Altintas et al. |
| 2010/0094996 A1* | 4/2010 | Samaha ............ G06Q 10/10 709/224 |
| 2018/0091438 A1* | 3/2018 | Zhang ............. H04L 61/5007 |
| 2019/0132709 A1* | 5/2019 | Graefe ............. G08G 1/0141 |
| 2019/0132819 A1 | 5/2019 | Tseng et al. |
| 2019/0222652 A1* | 7/2019 | Graefe ............... H04W 84/18 |
| 2020/0008044 A1* | 1/2020 | Poornachandran ... H04W 24/08 |
| 2020/0226921 A1* | 7/2020 | Higuchi ............. H04W 4/40 |
| 2020/0394914 A1* | 12/2020 | Higuchi ............. H04W 4/029 |
| 2022/0046468 A1* | 2/2022 | Altintas ............. H04W 4/44 |

(Continued)

OTHER PUBLICATIONS

Higuchi et al., "How to Keep a Vehicular Micro Cloud Intact", found at https://www.ccs-labs.org/bib/higuchi2018how/higuchi2018how.pdf, last downloaded Aug. 27, 2020, 5 pages.

(Continued)

*Primary Examiner* — Lewis G West

(74) *Attorney, Agent, or Firm* — Christopher G. Darrow; Darrow Mustafa PC

(57) ABSTRACT

Systems, methods, and other embodiments described herein relate to dynamically updating an existing vehicular micro cloud. In one embodiment, a method includes determining one or more parameters of an environment around a plurality of vehicles, and identifying an impact of the one or more parameters of the environment on one or more of the plurality of vehicles associated with the existing vehicular micro cloud. The method includes identifying one or more properties of the existing vehicular micro cloud. The method includes determining which adjustment to the one or more properties of the existing vehicular micro cloud can address the impact, and updating the one or more properties based on the determination.

20 Claims, 7 Drawing Sheets

(56) References Cited

U.S. PATENT DOCUMENTS

2022/0075365 A1\* 3/2022 Ucar .................... G06F 9/5072
2022/0180651 A1\* 6/2022 Strong ................. H04L 9/3239

OTHER PUBLICATIONS

Dressler F. et al., "Virtual Edge Computing Using Vehicular Micro Cloud", found at https://www.ccs-labs.org/bi/dressler2019virtual/dressler2019virtual.pdf, last downloaded Aug. 27, 2020, 5 pages.

\* cited by examiner

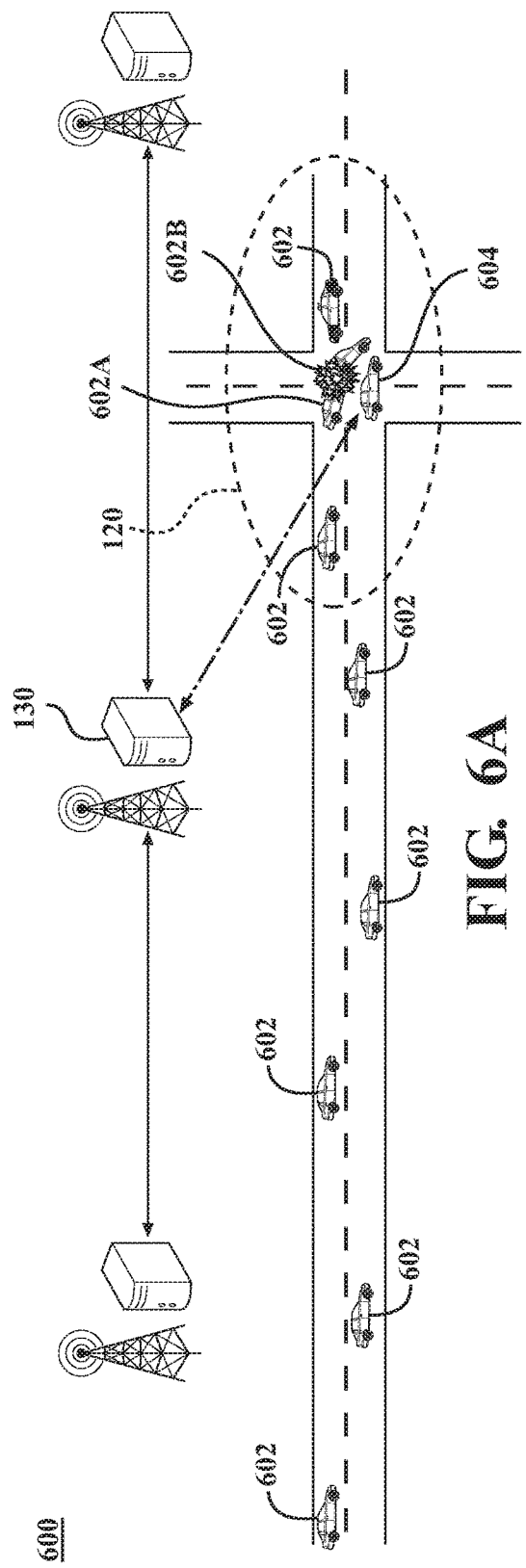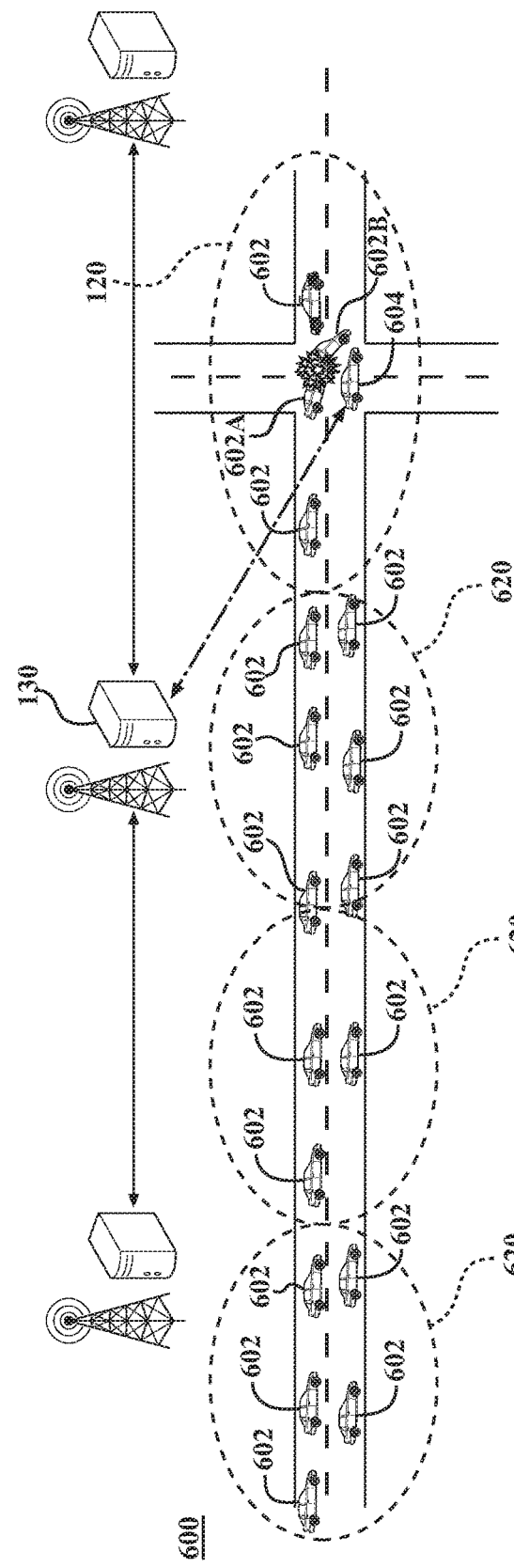

DYNAMIC ADJUSTMENT OF VEHICULAR MICRO CLOUD PROPERTIES

TECHNICAL FIELD

The subject matter described herein relates, in general, to systems and methods for adjusting one or more properties of an existing vehicular micro cloud.

BACKGROUND

Some connected vehicles can form groups of interconnected vehicles so as to share resources as the interconnected vehicles navigate through an environment. Vehicle members of the group, which is known as a "vehicular micro cloud" can be located within a similar geographic location.

Properties of a vehicular micro cloud are set when the vehicular micro cloud is formed, and can remain static. As such, a change in the environment can leave vehicle members unable to share resources to navigate the change in the environment as the vehicular micro cloud with its static properties becomes obsolete

SUMMARY

In one embodiment, a method for dynamically updating an existing vehicular micro cloud is disclosed. The method includes determining one or more parameters of an environment around a plurality of vehicles, and identifying an impact of the one or more parameters of the environment on one or more of the plurality of vehicles associated with the existing vehicular micro cloud. The method also includes identifying one or more properties of the existing vehicular micro cloud. The method includes determining which adjustment to the one or more properties of the existing vehicular micro cloud can address the impact, and updating the one or more properties based on the determination.

In another embodiment, a system for dynamically updating an existing vehicular micro cloud is disclosed. The system includes one or more processors, and a memory in communication with the one or more processors. The memory stores an environment parameter determination module including instructions that when executed by the one or more processors cause the one or more processors to determine one or more parameters of an environment around a plurality of vehicles. The memory stores an impact detection module including instructions that when executed by the one or more processors cause the one or more processors to identify an impact of the one or more parameters of the environment on one or more of the plurality of vehicles associated with the existing vehicular micro cloud. The memory stores a vehicular micro cloud update module including instructions that when executed by the one or more processors cause the one or more processors to identify one or more properties of the existing vehicular micro cloud, determine which adjustment to the one or more properties of the existing vehicular micro cloud can address the impact, and update the one or more properties based on the determination.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6A is an example of a dynamic vehicular micro cloud adjustment scenario with an existing vehicular micro cloud.

FIG. 6B is an example of the dynamic vehicular micro cloud adjustment scenario where the properties of the existing vehicular micro cloud have been adjusted.

DETAILED DESCRIPTION

Figure 1:
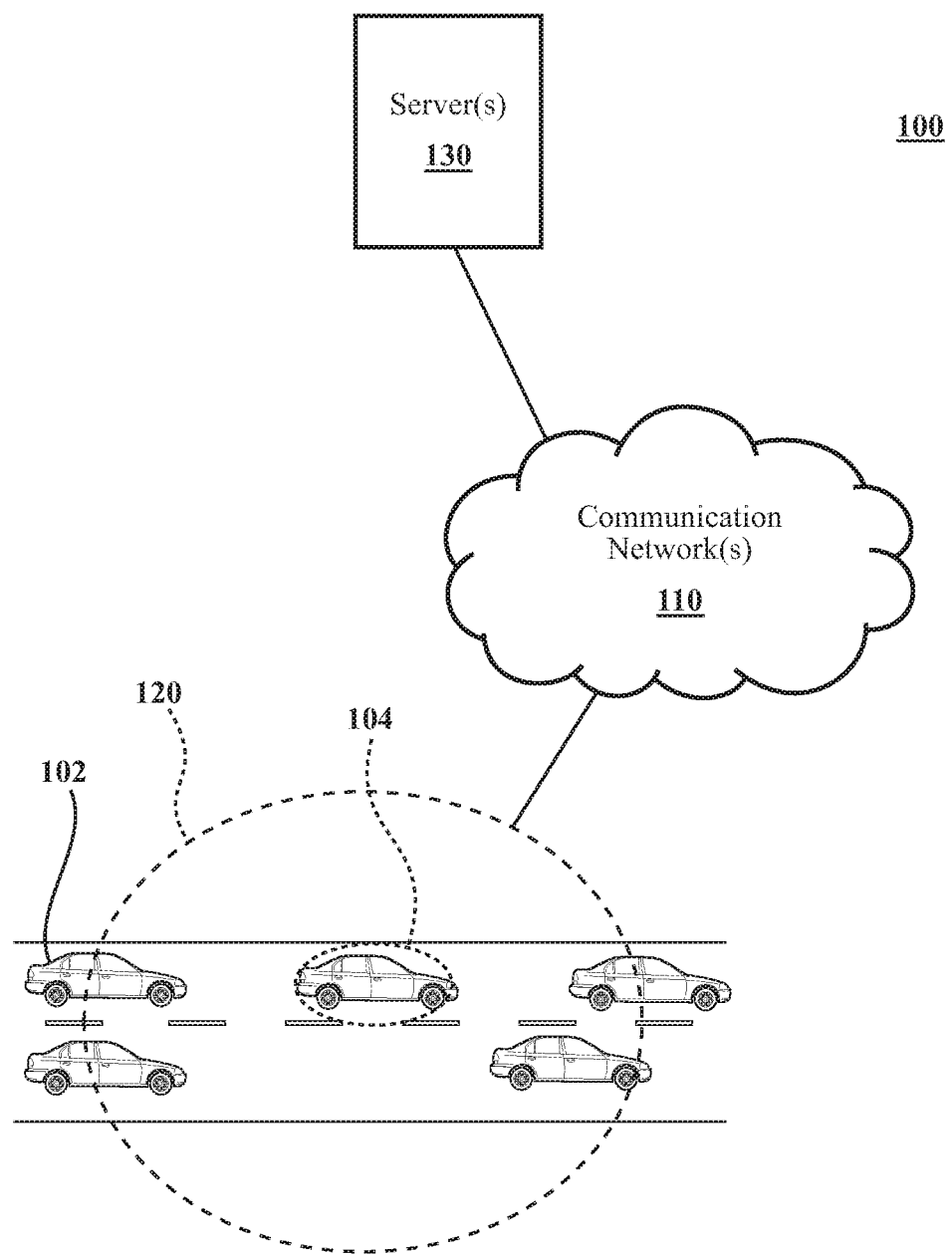
FIG. 1 is an example of a dynamic vehicular micro cloud adjustment system.

Systems, methods, and other embodiments associated with dynamically updating an existing vehicular micro cloud are disclosed. A plurality of connected vehicles can form a vehicular micro cloud so that the connected vehicles (being vehicular micro cloud members) can share information and resources to assist the connected vehicles collaborating in an environment. Properties of the vehicular micro cloud can be selected based on the characteristics or parameters of the environment. As such, the properties of the vehicular micro cloud are set when the vehicular micro cloud is formed.

The parameters can be influencing parameters for detecting and/or measuring an impact on the connected vehicles. The influencing parameters can be intrinsic and related to the vehicular micro cloud. Additionally and/or alternatively, the influencing parameters can be extrinsic and related to the environment. The parameters such as a priority, a task, and/or a purpose of the vehicular micro cloud can change over time, and with that, the type of resources the connected vehicles may use to collaborate in the environment can change. As an example, the connected vehicles can do one or more of assisting each other, sharing computational resources, communicating with each other, and any other suitable form of collaboration. A vehicular micro cloud set up for connected vehicles in one environment may be unsuitable for the connected vehicles in another environment.

Accordingly, in one embodiment, the disclosed approach is a system that dynamically updates an existing vehicular micro cloud. In other words, the system can dynamically update the properties of the existing vehicular micro cloud.

The system can determine the parameters of the environment by receiving information about the environment from sensors such as vehicle sensors or roadside sensors. The information can include information about traffic flow or traffic density, vehicle collisions, parked vehicles, road conditions, weather conditions, and/or visibility issues. The information can be static and/or dynamic. Further, the information can be based on actual and/or predicted values.

The system can determine what the properties of a vehicular micro cloud that would be suitable in assisting vehicular micro cloud members as the vehicular micro cloud members navigate the environment. The system can determine whether the properties of the existing vehicular micro cloud are suitable for assisting the vehicular micro cloud members navigating through the environment.

In the case that the system determines that the properties of the existing vehicular micro cloud are unsuitable, the system can update the properties of the existing vehicular micro cloud. As an example, the system can instruct a vehicular micro cloud member with access to the property settings of the vehicular micro cloud to change the properties.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a Dynamic Vehicular Micro Cloud Adjustment (DVMCA) system 100 is shown. The DVMCA system 100 may include various elements, which may be communicatively linked in any suitable form. As an example, the elements may be connected, as shown in FIG. 1. Some of the possible elements of the DVMCA system 100 are shown in FIG. 1 and will now be described. It will be understood that it is not necessary for the DVMCA system 100 to have all of the elements shown in FIG. 1 or described herein. The DVMCA system 100 can include one or more communication networks 110, one or more vehicular micro clouds 120, and/or one or more servers 130. The DVMCA system 100 may have any combination of the various elements shown in FIG. 1. Further, the DVMCA system 100 may have additional elements to those shown in FIG. 1. In some arrangements, the DVMCA system 100 may not include one or more of the elements shown in FIG. 1. Further, it will be understood that one or more of these elements may be physically separated by large distances.

The elements of the DVMCA system 100 may be communicatively linked through the one or more communication networks. As used herein, the term "communicatively linked" can include direct or indirect connections through a communication channel or pathway or another component or system. A "communication network" means one or more components designed to transmit and/or receive information from one source to another. The one or more of the elements of the DVMCA system 100 may include and/or execute suitable communication software, which enables the various elements to communicate with each other through the communication network and perform the functions disclosed herein.

The one or more communication networks 110 can be implemented as, or include, without limitation, a wide area network (WAN), a local area network (LAN), the Public Switched Telephone Network (PSTN), a wireless network, a mobile network, a Virtual Private Network (VPN), the Internet, one or more intranets, vehicle-to-vehicle (V2V) communication, vehicle-to-cloud (V2C) communication, and/or some other form of vehicle-to-everything (V2X) wireless communication. The communication network 110 further can be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2 or long-range (e.g., a mobile, cellular, and/or satellite-based wireless network; GSM, TDMA, CDMA, WCDMA networks or the like). The communication network 110 can include wired communication links and/or wireless communication links. The communication network 110 can include any combination of the above networks and/or other types of networks.

The DVMCA system 100 can include one or more connected vehicles 102. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be any device that, for example, transports passengers. In some implementations, the vehicle can be any other type of vehicle that may be used on a roadway, such as a motorcycle. In some implementation, the vehicle can be a watercraft, an aircraft, or any other form of motorized transport. The connected vehicle 102 can be a vehicle that is communicatively linked to one or more elements of the DVMCA system 100.

The DVMCA system 100 can include the one or more vehicular micro cloud(s) 120. A vehicular micro cloud 120 is a wireless network system in which a plurality of the connected vehicles 102, and optionally, devices such as non-vehicle node, form a group of interconnected member vehicles 102. The interconnected member vehicles 102, also known as vehicular micro cloud members, can communicate and share resources with each other using, as an example, V2V communication. The vehicular micro cloud members 102 can include one or more cloud leaders 104. The cloud leader(s) 104 can be the vehicular micro cloud member 102 that forms, maintains and/or updates the vehicular micro cloud 120. The cloud leader 104 can determine and/or manage how the computing resources of the vehicular micro cloud 120 are utilized by the vehicular micro cloud members 102.

The vehicular micro cloud 120 can have one or more properties disclosed herein. As an example, the properties of the vehicular micro cloud 120 can be stored, maintained, and updated by the cloud leader 104. The one or more properties of the vehicular micro cloud 120 can include a priority. The priority can be a goal for the vehicular micro cloud 120. As an example, the priority of the vehicular micro cloud 120 can be safety, comfort, and time management. In some arrangements, one of safety, comfort, and time management can be of higher importance than the other two. In a case where the priority of the vehicular micro cloud 120 is safety, the vehicular micro cloud 120 can be formed and maintained to advance the safety of passenger(s) and/or pedestrian(s). As an example, the vehicular micro cloud members 102 can exchange information such as weather conditions, road conditions, and traffic conditions, and share resources to determine safe routes. As another example, if the vehicular micro cloud member 102 has information that indicates that a driver can be easily distracted, the vehicular micro cloud member 102 can share resources to identify and travel on routes with less or no distractions. In a case where the priority of the vehicular micro cloud 120 is comfort, the vehicular micro cloud 120 can be formed and maintained to advance the comfort of the passengers. As an example, the vehicular micro cloud members 102 can share resources to identify the routes that provide the smoothest rides. The vehicular micro cloud members 102 can share resources so as to, as an example, drive at a comforting speed and change lanes in a smooth manner. In a case where the priority of the vehicular micro cloud 120 is time management, the vehicular micro cloud 120 can be formed and maintained to manage the travel time of the passenger(s). The vehicular micro cloud members 102 can share resources to determine traffic conditions and the fastest route(s) so as to minimize travel time. In some other arrangements, two of safety, comfort, and time management can be of higher importance than the remaining third. In some other arrangements, safety, comfort, and time management can be of equal importance.

The one or more properties of the vehicular micro cloud 120 can include a mobility type. The mobility type can refer to whether the vehicular micro cloud 120 is movable or immovable. In such a case, the vehicular micro cloud 120 can be a stationary vehicular micro cloud 120 or a mobile vehicular micro cloud 120. A stationary vehicular micro cloud 120 can be tied to a fixed geographic location, e.g., an intersection. In such a case, a connected vehicle can join the stationary vehicular micro cloud 120 when the connected vehicle is within the fixed geographic location of the stationary vehicular micro cloud 120. The connected vehicle can leave the stationary vehicular micro cloud 120 when the connected vehicle exits the fixed geographic location of the stationary vehicular micro cloud 120. A mobile vehicular micro cloud 120 can be tied to vehicular micro cloud members that are travelling in the same direction. The mobile vehicular micro cloud 120 can travel with the vehicular micro cloud members, and as such, the geographic location of the mobile vehicular micro cloud 120 moves with the vehicular micro cloud members. A connected vehicle can join the mobile vehicular micro cloud 120 when the connected vehicle is in an area covered by the mobile vehicular micro cloud 120. The connected vehicle can leave the mobile vehicular micro cloud 120 when the connected vehicle exits the area covered by the mobile vehicular micro cloud 120.

The one or more properties of the vehicular micro cloud 120 can include an origin type. The origin type can refer to the circumstances under which the vehicular micro cloud 120 is formed. As an example, a vehicular micro cloud 120 can be a pre-assigned vehicular micro cloud 120 or an on-demand vehicular micro cloud 120. A pre-assigned vehicular micro cloud 120 can be formed independent of an event or an occurrence. The pre-assigned vehicular micro cloud 120 can be formed prior to and in anticipation of an event or occurrence, however the pre-assigned vehicular micro cloud 120 may not formed in response to the event or occurrence. An on-demand vehicular micro cloud 120 can be formed in response to an event or occurrence. As an example, in response to an accident ahead, connected vehicles can form an on-demand vehicular micro cloud 120 such that the vehicular micro cloud members can share information about alternate routes of travel. The on-demand vehicular micro cloud 120 can exist in response to an event or occurrence and can be dissolved when the impact of the event or occurrence no longer exist.

The one or more properties of the vehicular micro cloud 120 can include a dependency type. The dependency type can refer to the dependency or lack of dependency of the vehicular micro cloud 120 on other vehicular micro cloud(s) 120. In such a case, a vehicular micro cloud 120 can be an independent vehicular micro cloud 120 or an interdependent vehicular micro cloud 120. An independent vehicular micro cloud 120 can include vehicular micro cloud members of the independent vehicular micro cloud 120 that can communicate and share resources with each other within the independent vehicular micro cloud 120. An interdependent vehicular micro cloud 120 can include vehicular micro cloud members of the interdependent vehicular micro cloud 120 that communicate and share resources with each other within the interdependent vehicular micro cloud 120 as well as with member vehicles belonging to another interdependent vehicular micro cloud 120. The vehicular micro cloud members in the independent vehicular micro cloud 120 can communicate with each other in any suitable communication method. The vehicular micro cloud members in the interdependent vehicular micro clouds 120 can communicate with each other in any suitable communication method.

The one or more properties of the vehicular micro cloud 120 can include a scale type. The scale type can refer to the scale of the vehicular micro cloud 120. In such a case, the vehicular micro cloud 120 can remain small scale as the vehicular micro cloud 120 and can limit communication with other vehicular micro clouds 120. The scale type can be large scale such as a vehicular macro cloud. The vehicular macro cloud can include a plurality of connected vehicles spanning a large geographical region such as a city. The member vehicles of the vehicular macro cloud can communicate across a city, as an example, using any suitable network such as V2V or V2I communication networks. The member vehicles of the vehicular macro cloud can belong to one or more vehicular micro clouds 120. The one or more vehicular micro clouds 120 can communicate with each other to form the vehicular macro cloud. The vehicular micro cloud 120 can include a plurality of connected vehicles within a limited geographical region. The member vehicles of the vehicular micro cloud 120 can communicate and share resources with each other using, as an example, V2V communication. The vehicular micro cloud members 102 can include one or more cloud leader vehicles 104 of the vehicular micro cloud 120. The cloud leader vehicle 104 can be the member vehicle that forms, maintains and/or updates the vehicular micro cloud 120. The cloud leader vehicle 104 can determine and/or manage how the computing resources of the vehicular micro cloud 120 are utilized by the members of the vehicular micro cloud 120.

The one or more properties of the vehicular micro cloud 120 can include a communication category. The communication category can refer to a communication configuration. As an example, a vehicular micro cloud 120 can utilize ad-hoc communication and/or hybrid communication. Member vehicles of a vehicular micro cloud 120 that has the ad-hoc communication model can communicate with each other using V2V communication. Member vehicles of a vehicular micro cloud 120 that has the hybrid communication model can communicate with each other using a combination of V2V communication and V2C communication. Member vehicles of the vehicular micro cloud 120 can use any suitable means of communication in addition to those mentioned above.

The one or more properties of the vehicular micro cloud 120 can include a collaboration criteria. The collaboration criteria can refer to a reason for connected vehicles to collaborate, exchange information, assist each other, and share resources. The collaboration criteria can include an objective function. The objective function can be an objective of the vehicular micro cloud 120. As an example, the objective function can be to improve awareness, which can refer to informing vehicular micro cloud members about an event or occurrence in the environment and making the vehicular micro cloud members aware. As another example, the objective function can be to mitigate traffic congestion. As another example, the objective function can be to mitigate stop-and-go traffic. The collaboration criteria can include an optimization method. The optimization method can be to maximize a goal of the vehicular micro cloud 120 or minimize an impact of the environment on the member vehicles. As an example, the optimization method can be to maximize intersection safety. As another example, the optimization method can be to minimize safety risk. As another example, the optimization method can be to minimize driver situation analysis by providing speed advisories and lane change recommendations.

The DVMCA system 100 can include the one or more servers 130. The server(s) 130 may be, for example, cloud-based server(s) or edge-based server(s). The server(s) 130 can communicate with one or more connected vehicles 102 over a communication module, such as by any type of V2C communications, now known or later developed. The server(s) 130 can receive data from and send data to the connected vehicle(s) 102. Alternatively and/or additionally, the connected vehicle(s) 102 and the server(s) 130 may communicate over other suitable means such as V2X communications.

Figure 2:
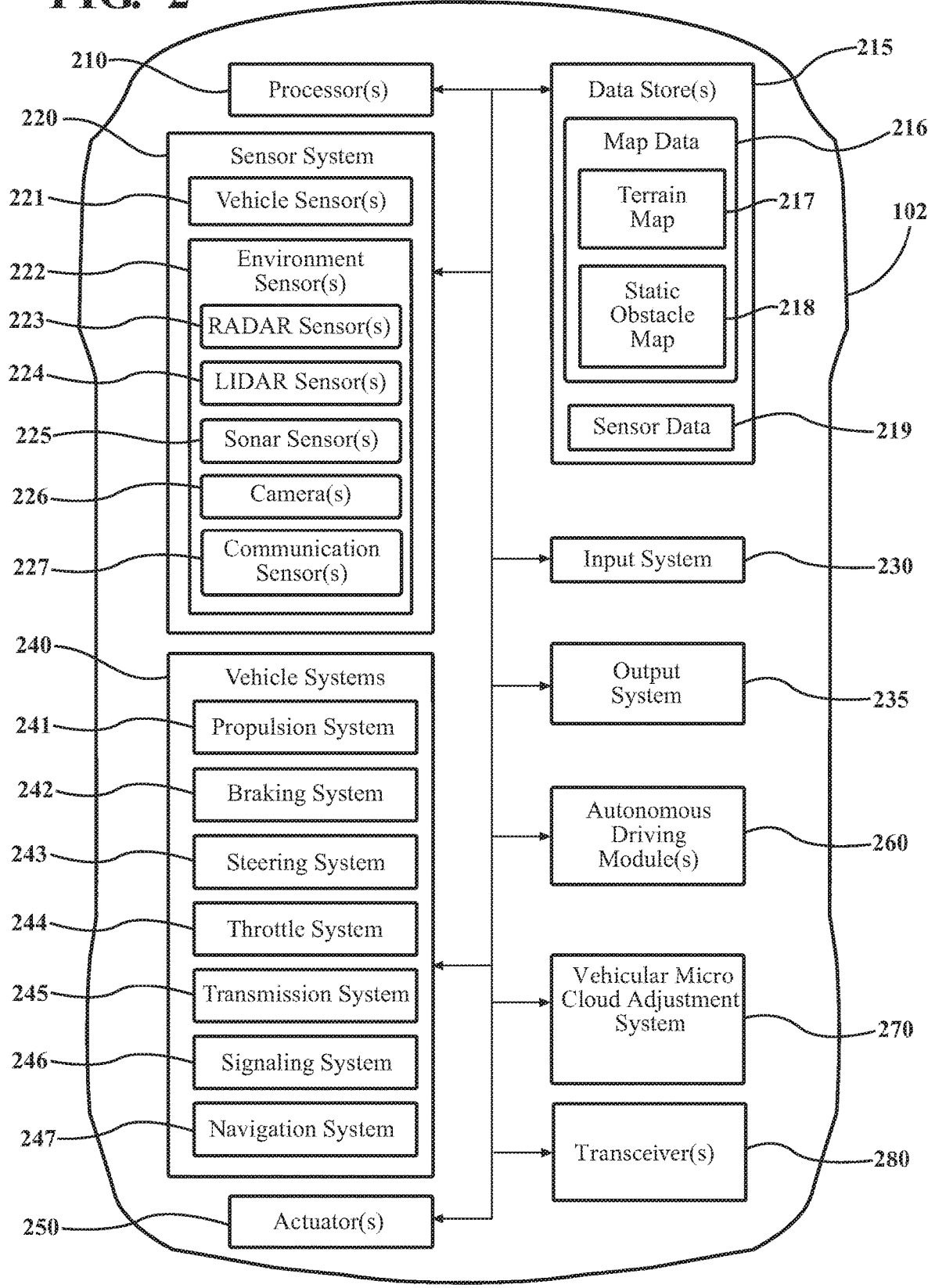
FIG. 2 illustrates a block diagram of a vehicle incorporating a vehicular micro cloud adjustment system.

Referring to FIG. 2, a block diagram of the connected vehicle incorporating a vehicular micro cloud adjustment system 270 is illustrated. The connected vehicle includes various elements. It will be understood that in various embodiments, it may not be necessary for the connected vehicle 102 to have all of the elements shown in FIG. 2. The connected vehicle 102 can have any combination of the various elements shown in FIG. 2. Further, the connected vehicle 102 can have additional elements to those shown in FIG. 2. In some arrangements, the connected vehicle 102 may be implemented without one or more of the elements shown in FIG. 2. While the various elements are shown as being located within the connected vehicle 102 in FIG. 2, it will be understood that one or more of these elements can be located external to the connected vehicle 102. Further, the elements shown may be physically separated by large distances. For example, as discussed, one or more components of the disclosed system can be implemented within a vehicle while further components of the system are implemented within a cloud-computing environment, as discussed further subsequently.

Some of the possible elements of the connected vehicle 102 are shown in FIG. 2 and will be described along with subsequent figures. However, a description of many of the elements in FIG. 2 will be provided after the discussion of FIGS. 3-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the connected vehicle 102 includes the vehicular micro cloud adjustment system 270 that is implemented to perform methods and other functions as disclosed herein relating to dynamically updating an existing vehicular micro cloud 120. As will be discussed in greater detail subsequently, the vehicular micro cloud adjustment system 270, in various embodiments, may be implemented partially within the connected vehicle 102 and may further exchange communications with additional aspects of the vehicular micro cloud adjustment system(s) 270 that are remote from the connected vehicle 102 in support of the disclosed functions. Thus, while FIG. 3 generally illustrates the vehicular micro cloud adjustment system 270 as being self-contained, in various embodiments, the vehicular micro cloud adjustment system 270 may be implemented within multiple separate devices some of which may be remote from the connected vehicle 102.

Figure 3:
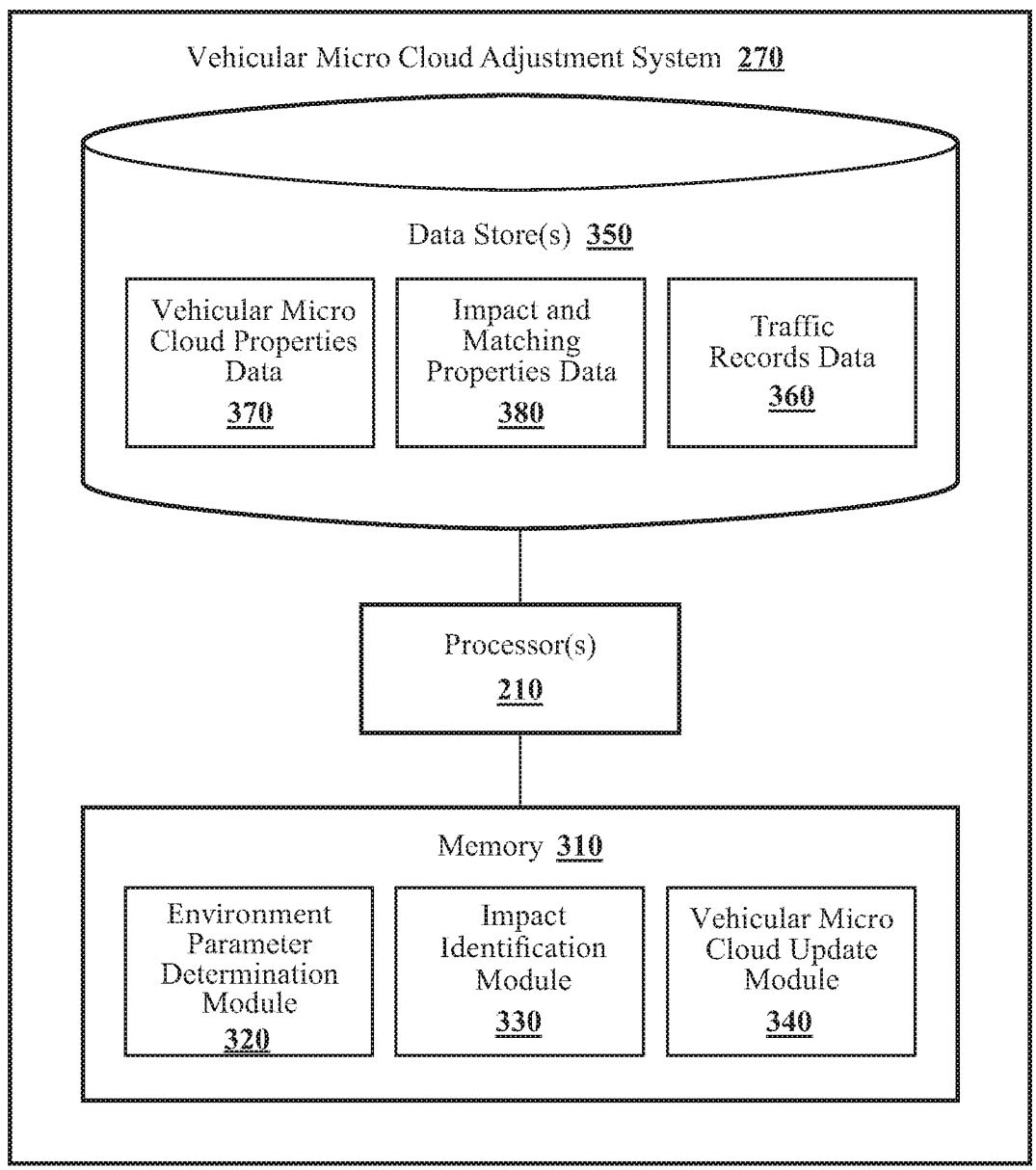
FIG. 3 illustrates one embodiment of the vehicular micro cloud adjustment system.

With reference to FIG. 3, one embodiment of the vehicular micro cloud adjustment system 270 of FIG. 2 is further illustrated. The vehicular micro cloud adjustment system 270 is shown as including a processor 210 from the connected vehicle 102 of FIG. 2. Accordingly, the processor 210 can be a part of the vehicular micro cloud adjustment system 270, the vehicular micro cloud adjustment system 270 can include a separate processor from the processor 210 of the connected vehicle 102, and/or the vehicular micro cloud adjustment system 270 may access the processor 210 through a data bus or another communication path. In further aspects, the processor 210 is a cloud-based resource that communicates with the vehicular micro cloud adjustment system 270 through a communication network.

In one embodiment, the vehicular micro cloud adjustment system 270 can include a memory 310 that stores an environment parameter determination module 320, an impact identification module 330, and a vehicular micro cloud update module 340. The memory 310 is a random-access memory (RAM), read-only memory (ROM), a hard-disk drive, a flash memory, or other suitable memory for storing the modules 320, 330, and 340. The environment parameter determination module 320, the impact identification module 330, and the vehicular micro cloud update module 340 are, for example, computer-readable instructions within the physical memory 310 that when executed by the processor 210 cause the processor 210 to perform the various functions disclosed herein.

In one embodiment, the vehicular micro cloud adjustment system 270 can include a data store 350. The data store 350 is, in one embodiment, an electronic data structure (e.g., a database) stored in the memory 310 or another data store and that is configured with routines that can be executed by the processor 210 for analyzing stored data, providing stored data, organizing stored data, and so on. Thus, in one embodiment, the data store 350 can store data used by the modules 320, 330 and 340 in executing various functions. In one embodiment, the data store 350 can include traffic records data 360, vehicular micro cloud properties data 370, impact and matching properties data 380 and or other information that is used by the modules 320, 330, and 340.

The traffic records data 360 can contain statistical records of past traffic information such as traffic patterns based on geographic location and time of day. The traffic records data 360 can include previously recorded traffic information for the geographic location. The vehicular micro cloud properties data 370 can include information about the properties of the existing vehicular micro cloud 120. The properties are described in detail above. The impact and matching properties data 380 can include a database populated with the various types of impacts matched with the adjustments to the properties of the existing vehicular micro cloud 120 that can address each of the various impacts. In other words, the database can include mapping an impact to vehicular micro cloud properties that can address the impact. As an example, an entry in the database can include the impact being a portion of a road along the route of travel is inaccessible due to flooding, and the adjustments to address the impact can include adjusting priority to safety, mobility type to stationary, dependency type to interdependent, communication category to V2C communication, and/or optimization method to maximize safety while traversing the flooded road. The mapping can be determined using any suitable method such as based on a statistical analysis and/or machine learning algorithms.

In one embodiment, the environment parameter determination module 320 can include instructions that function to control the processor 210 to determine one or more parameters of an environment around a plurality of vehicles. As such, the environment can be around one or more vehicles. As an example, the vehicle(s) can be member vehicle(s) of the vehicular micro cloud 120. Alternatively, the vehicle(s) may not be member vehicle(s) of the vehicular micro cloud 120. In such a case and as an example, the vehicle(s) can be located ahead of the vehicular micro cloud 120 along a travel route. As another example, the vehicle(s) can be located behind the vehicular micro cloud 120 along the route.

The parameter(s) of the environment can be a characteristic of the environment that can affect a vehicle travelling in or towards the environment. As an example, a parameter can be a vehicle accident that has occurred in the environment. As another example, a parameter can be a parked or stalled vehicle in the environment. As another example, a parameter can be traffic congestion in the environment. Similar to the vehicle accident and stalled vehicle, the traffic congestion can cause the vehicle to change its travel route and/or recalculate its travel time. As another example, a parameter can be a road condition in the environment. The road condition can be, as an example, road damage such as a pothole, or road flooding. As another example, a parameter can be a weather condition in the environment. The aforementioned examples of parameters can cause the vehicle to change its travel route and/or recalculate its travel time.

The environment parameter determination module 320 can further include instructions that function to control the processor to monitor the environment. The environment parameter determination module 320 can receive information about the environment from vehicle sensors. Alternatively and/or additionally, the environment parameter determination module 320 can receive information about the environment from external sources. The external sources may include any entities capable of wireless communication such as other vehicles, roadside units, servers, and/or databases.

The information about the environment can include a weather condition, a road condition, location of the road segment(s), and/or timestamp. The weather condition may include, as an example, presence of precipitation such as snow, rain, and/or hail. The weather condition may further include impacts of weather such as fog levels, fallen snow levels (i.e. the amount of snow on the ground), and/or flooding. The weather condition may be updated periodically and/or on-demand. The road condition may include information about the physical condition of the road segment(s). The road condition may include the presence of potholes, road debris, overgrown vegetation, the slope of the road segment(s), the curvature of the road segment(s), and/or the friction level of the road segment(s).

The environment parameter determination module 320 can determine the parameters of the environment based on predicting events that can occur in the environment. As an example, the environment parameter determination module 320 can access a database such as the data store(s) 350 to determine the amount of traffic that can be expected on a certain road at a certain time and day. As an example, the environment parameter determination module 320 can access and process information in the traffic records data 360 to predict parameters of the environment.

The impact identification module 330 can include instructions that function to control the processor 210 to identify an impact of the one or more parameters of the environment on one or more of the plurality of vehicles associated with the existing vehicular micro cloud 120. The vehicles associated with the existing vehicular micro cloud 120 can be member vehicles of the existing vehicular micro cloud 120. Alternatively, the vehicles associated with the existing vehicular micro cloud 120 can be vehicles that are not member vehicles of the existing vehicular micro cloud 120 but are proximate to the geographical location of the existing vehicular micro cloud 120.

The impact identification module 330 can use any suitable algorithm such as a machine learning algorithm or an artificial intelligence process to identify the impact of the one or more parameters of the environment on the vehicles associated with the existing vehicular micro cloud 120. As an example, the impact identification module 330 can determine that the impact of a vehicle accident on a vehicle can be road closure such that the impacted vehicle is unable to traverse along an intended route. As another example, the impact identification module 330 can determine that the impact of a vehicle accident can be traffic congestion such that the impacted vehicle encounters a time delay. As another example, the impact identification module 330 can determine that the impact of a vehicle accident can result in a safety risk as drivers get distracted as they drive by and observe the vehicle accident.

The impact identification module 330 can determine the impact of the parameters of the environment on a vehicle based on the parameters of the environment and other factors such as time of day and vehicle location. As an example, the impact identification module 330 can determine that the impact on a vehicle is a time delay when there is a vehicle accident, and the vehicle is on a high traffic road such as a highway at a peak time such as an evening rush hour. As another example, the impact identification module 330 can determine that the impact on the vehicle can be that the intended route of travel is blocked or unavailable when there is flooding or a fallen tree on a road along the intended route.

The vehicular micro cloud update module 340 can include instructions that function to control the processor 210 to identify one or more properties of the existing vehicular micro cloud 120, determine which adjustment to the one or more properties of the existing vehicular micro cloud 120 can address the impact, and update the one or more properties based on the determination.

The vehicular micro cloud update module 340 can identify the properties of the existing vehicular micro cloud 120 by, as an example, requesting the properties of the existing vehicular micro cloud 120 from the cloud leader. In such a case, the vehicular micro cloud update module 340 can request the information from the cloud leader using a suitable means of communication. As another example, the vehicular micro cloud update module 340 can access the properties of the existing vehicular micro cloud 120 from the data store(s) 350. In such an example and as previously explained, the data store(s) 350 can include vehicular micro cloud properties data 370 that contain the properties of the existing vehicular micro cloud 120. The vehicular micro cloud update module 340 can receive the information which can include the mobility type, the priority, the origin type, the size type, communication category, the dependency type, and/or the collaboration criteria of the vehicular micro cloud 120. As another example, the vehicular micro cloud update module 340 can identify the properties of the existing vehicular micro cloud 120 by monitoring or observing the existing vehicular micro cloud 120.

The vehicular micro cloud update module 340 can determine which adjustment to the one or more properties of the existing vehicular micro cloud 120 can address the impact to the vehicles. The vehicular micro cloud update module 340 can use any suitable algorithm to determine which adjustments to the properties of the existing vehicular micro cloud 120 can address the impact. As an example, the vehicular micro cloud update module 340 can access a database populated with the various types of impacts matched with the adjustments to the properties of the existing vehicular micro cloud 120 that can address each of the various impacts such as the impact and matching properties data 380 in the data store(s).

The vehicular micro cloud update module 340 can include instructions that function to control the processor 210 to update the one or more properties based on the determination. The vehicular micro cloud update module 340 can identify an original reason for the existing vehicular micro cloud 120. The original reason refers to a reason that led to the existing vehicular micro cloud 120 being formed and/or continuing to exist. The original reason can be based on one or more of traffic flow, traffic density, a vehicle accident, a road closure, an unusual event, and a risk. In other words, the existing vehicular micro cloud 120 can be formed or can continue to exist to assist vehicles as the vehicles travel amidst one or more of the traffic flow, the traffic density, the vehicle accident, the road closure, an unusual event, and any other risk. The vehicular micro cloud update module 340 can identify the original reason for the existing vehicular micro cloud 120 by requesting information about the original reason from a cloud member 102 or a cloud leader 104.

The vehicular micro cloud update module 340 can identify a new reason for the existing vehicular micro cloud 120 based on the one or more parameters of the environment. In other words, the vehicular micro cloud update module 340 can identify the new reason for the existing vehicular micro cloud 120 as a reason that a vehicular micro cloud 120 can be formed or can exist such that the vehicular micro cloud 120 can assist vehicles as the vehicles address the impact of the parameters of the environment. The vehicular micro cloud update module 340 can determine the new reason using any suitable algorithm. As an example, the vehicular micro cloud update module 340 can access a database populated with the various parameters matched with the reason for a vehicular micro cloud 120. The vehicular micro cloud update module 340 can determine the new reason for the vehicular micro cloud 120 by identifying the parameters of the environment in the database and retrieving a reason matched to identified parameters.

The vehicular micro cloud update module 340 can determine that the original reason and the new reason are different. In other words, the vehicular micro cloud update module 340 can compare the original reason and the new reason to determine whether the original reason and the new reason are the same or different.

The vehicular micro cloud update module 340 can, in response to determining that the original reason and the new reason are different, determine which adjustment to the one or more properties of the existing vehicular micro cloud 120 can address the impact based on the new reason. The vehicular micro cloud update module 340 can update the properties of the existing vehicular micro cloud 120 based on the determined adjustment(s) in response to the original reason and the new reason for the existing vehicular micro cloud 120 being different.

The vehicular micro cloud update module 340 can update the properties by transmitting the determined properties to the cloud leader 104 using any suitable communication means. As an example, the vehicular micro cloud update module 340 can transmit a message to the cloud leader 104 indicating that the properties of the vehicular micro cloud 120 be updated from stationary to mobile, from independent to interdependent, from time management priority to safety priority, and/or from ad-hoc communication to hybrid communication. As another example, the vehicular micro cloud update module 340 can determine that another vehicle 102 other than the current cloud leader 104 become the cloud leader 104. In such an example, the vehicular micro cloud update module 340 can transmit a message to the other vehicle 102 requesting the other vehicle 102 become the cloud leader 104 and indicating the updated properties of the vehicular micro cloud 120.

Figure 4:
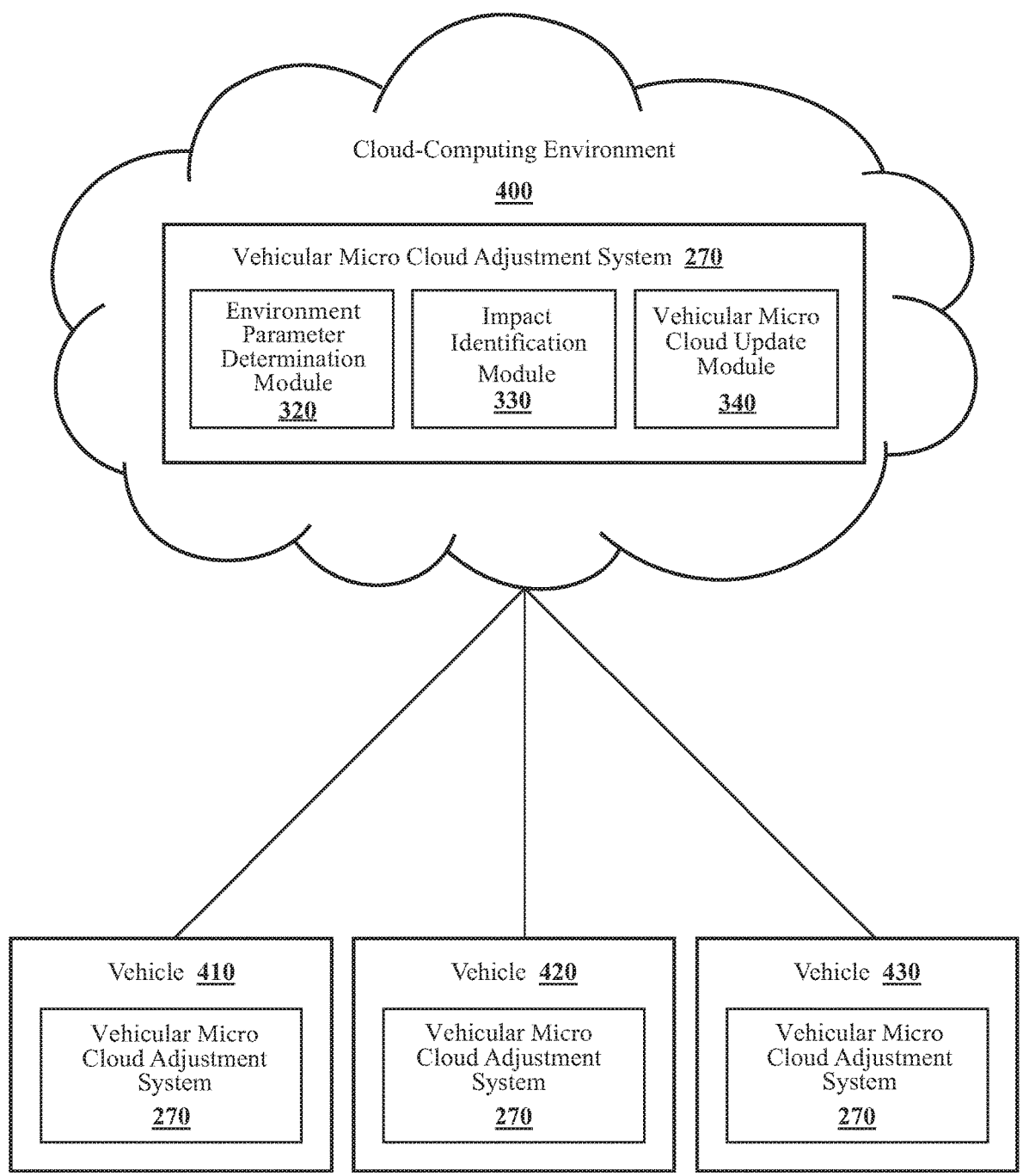
FIG. 4 illustrates a diagram of the vehicular micro cloud adjustment system in a cloud-based configuration.

The vehicular micro cloud adjustment system 270 may be further implemented as a cloud-based system that functions within a cloud-computing environment 400 as illustrated in relation to FIG. 4. That is, for example, the vehicular micro cloud adjustment system 270 may acquire telematics data (i.e., sensor data 219) from vehicles and execute as a cloud-based resource that is comprised of devices (e.g., distributed servers) remote from the connected vehicle 102 to dynamically update the existing vehicular micro cloud 120. Accordingly, the vehicular micro cloud adjustment system 270 may communicate with connected vehicles (e.g., connected vehicles 410, 420, and 430) that are geographically distributed. In one approach, the cloud-based vehicular micro cloud adjustment system 270 can exchange data 350 with components or separate instances of the vehicular micro cloud adjustment system 270 that are integrated with the connected vehicles 410-430.

Along with the communications, the connected vehicles 410-430 may provide sensor data 219. As such, the cloud-based aspects of the vehicular micro cloud adjustment system 270 may then process the sensor data 219 separately for the vehicles 410-430 to determine the one or more parameters of the environment. In further aspects, the vehicle-based systems may perform part of the processing while the cloud-computing environment 400 may handle a remaining portion or function to validate results of the vehicle-based systems. It should be appreciated that apportionment of the processing between the vehicle and the cloud may vary according to different implementations. Additional aspects of the cloud computing environment 400 are discussed above in relation to components of the vehicular micro cloud adjustment system 270 and FIG. 3.

Figure 5:
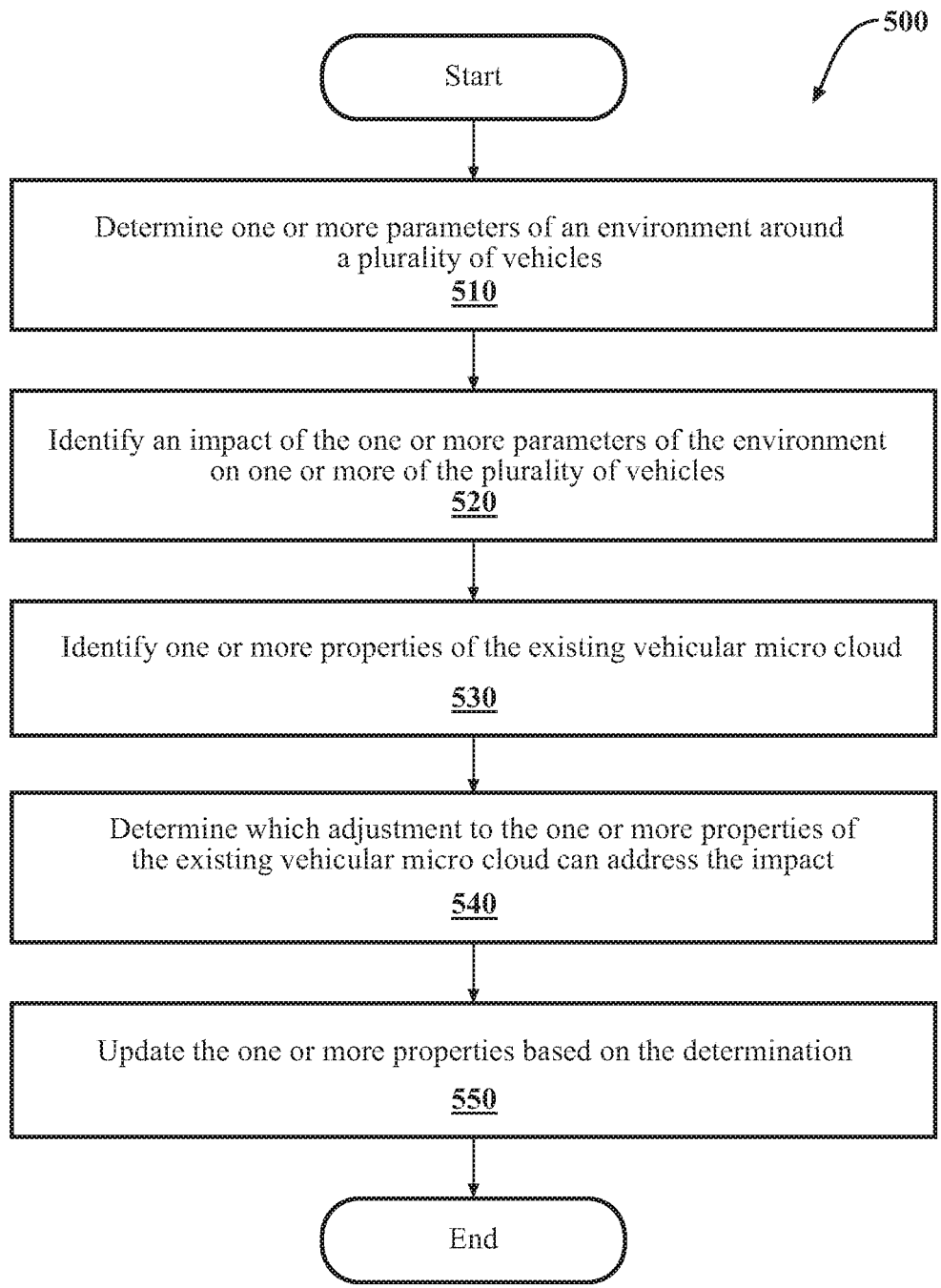
FIG. 5 is a flowchart illustrating one embodiment of a method associated with adjusting properties of an existing vehicular micro cloud.

FIG. 5 illustrates a method 500 for dynamically updating an existing vehicular micro cloud 120. The method 500 will be described from the viewpoint of the connected vehicle 102 of FIG. 2 and the vehicular micro cloud adjustment system 270 of FIG. 3. However, the method 500 may be adapted to be executed in any one of several different situations and not necessarily by the connected vehicle 102 of FIG. 2 and/or the vehicular micro cloud adjustment system 270 of FIG. 3.

At step 510, the environment parameter determination module 320 can cause the processor(s) 210 to determine one or more parameters of an environment around a plurality of vehicles. As previously mentioned, the environment parameter determination module 320 can determine the parameters by receiving sensor data from vehicle sensors or by receiving information from external sources such as other vehicles or database servers.

At step 520, the impact identification module 330 can cause the processor(s) 210 to identify an impact of the one or more parameters of the environment on one or more of the plurality of vehicles associated with the existing vehicular micro cloud 120. As an example, the impact identification module 330 can identify the impact based on a statistical analysis and/or machine learning methods. An example of an impact can include a portion of a road along the travel route of the vehicle(s) being inaccessible.

At step 530, the vehicular micro cloud update module 340 can cause the processor(s) 210 to identify one or more properties of the existing vehicular micro cloud 120, as discussed above.

At step 540, the vehicular micro cloud update module 340 can cause the processor(s) 210 to determine which adjustment to the properties of the existing vehicular micro cloud 120 can address the impact. The vehicular micro cloud update module 340 may use any suitable algorithm, as previously discussed, to determine which adjustment to the properties of the existing vehicular micro cloud 120 can address the impact.

At step 550, the vehicular micro cloud update module 340 can cause the processor(s) 210 to update the one or more properties based on the determination. The vehicular micro cloud update module 340 can transmit the updated properties to the current cloud leader 104 or the vehicular micro cloud update module 340 can select a new cloud leader and transmit the updated properties to the newly selected cloud leader, as previously discussed.

A first non-limiting example of the operation of the vehicular micro cloud adjustment system 270 and/or one or more of the methods will now be described in relation to FIGS. 6A-6B. FIGS. 6A-6B show an example of a dynamic vehicular micro cloud adjustment scenario 600.

In FIG. 6A, a stationary vehicular micro cloud 120 can exist at an intersection M. Connected vehicles 602 travelling through the intersection can join and/or exit the existing vehicular micro cloud 120. The connected vehicle 604, which is similar to vehicle 102, can be a cloud leader 104 in the existing vehicular micro cloud 120, as the connected vehicle 604 travels through the intersection. In this example, the existing vehicular micro cloud 120 can have the following properties: safety as the priority type, stationary as the mobility type, independent as the dependency type, pre-assigned as the origin type, hybrid as the communication type, traffic flow as the reason, improve awareness as the collaboration objective, and maximize intersection safety as the optimization method. The vehicular micro cloud adjustment system 270 can be located in the cloud leader 104, the server 130, and/or any other connected vehicle 102.

The vehicular micro cloud adjustment system 270, or more specifically, the environment parameter determination module 320 can determine one or more parameters of the environment around the intersection and the vehicles proximate to the intersection. As shown in FIG. 6A, two vehicles 602A, 602B have collided. The environment parameter determination module 320 can receive information about the environment from, as an example, the cloud leader 604 or a server 130. The cloud leader 604 can observe the collision using vehicle sensors 221 and can transmit the information to the environment parameter determination module 320. The environment parameter determination module 320 can communicate with the server 130 and receive information from the server 130 indicating that there is upcoming traffic. As an example, the server 130 can obtain the information using sensors or by accessing a traffic control database.

The vehicular micro cloud adjustment system 270, or more specifically, the impact identification module 330 can identify an impact of the parameters of the environment on the vehicle(s) associated with the existing vehicular micro cloud 120. The impact identification module 330 can determine that the impact of the collision can be traffic congestion based on the information that includes a vehicle collision at the intersection, the number of vehicles in the intersection and the number of vehicles approaching the intersection. The impact identification module 330 can further determine that traffic congestion can increase the risk of additional collisions. As previously mentioned, the impact identification module 330 can use any suitable algorithm to determine the impact of the collision on the vehicles in the environment.

The vehicular micro cloud adjustment system 270, or more specifically the vehicular micro cloud update module 340 can identify one or more properties of the existing vehicular micro cloud 120. The vehicular micro cloud update module 340 can identify the properties by requesting the information from, as an example, the cloud leader 604 or the server 130. Alternatively and/or in addition, the vehicular micro cloud update module 340 can observe the environment to determine the properties of the vehicular micro cloud 120. In this example, the vehicular micro cloud update module 340 can request the information from the cloud leader 604 and the cloud leader 604 can provide the properties of the vehicular micro cloud 120 as listed above.

The vehicular micro cloud adjustment system 270, or more specifically the vehicular micro cloud update module 340 can determine which adjustment to the one or more properties of the existing vehicular micro cloud 120 can address the impact. In this case, the impact is traffic congestion which can lead to safety risks such as a risk of additional collisions. The vehicular micro cloud update module 340 can determine the properties that a vehicular micro cloud 120 can have to assist vehicles travelling through the environment. As an example, the vehicular micro cloud update module 340 can access a database that matches the impacts to the related properties of a vehicular micro cloud 120. As another example and as previously mentioned, the vehicular micro cloud update module 340 can apply any suitable algorithm to determine the properties of the vehicular micro cloud 120. In this example, the vehicular micro cloud update module 340 can determine the following properties—safety as the priority type, stationary as the mobility type, interdependent as the dependency type, on-demand as the origin type, hybrid as the communication type, vehicle collision as the reason, mitigate traffic congestion as the collaboration objective, and minimize safety risk as the optimization method.

The vehicular micro cloud adjustment system 270, or more specifically the vehicular micro cloud update module 340 can compare the original reason and the new reason. In this case, the vehicular micro cloud update module 340 can compare the original reason, which is traffic flow with the new reason, which is a vehicle collision, and can determine that the original reason and the new reason are different. In response to determining that the original reason and the new reason are different, the vehicular micro cloud update module 340 can update the properties of the existing cloud by transmitting a message to the cloud leader 604 to adjust the properties of the vehicular micro cloud 120. In this case, in response to receiving the message, the cloud leader 604 can adjust the dependency type from independent to interdependent. In this example and as shown in FIG. 6B, the server 130 can transmit a message to the approaching vehicles, instructing the approaching vehicles to form vehicular micro clouds 620 that are interdependent. When the approaching vehicles form interdependent vehicular micro clouds 620 and the existing vehicular micro cloud 120 adjusts from an independent dependency type to an interdependent dependency type, the existing vehicular micro cloud 120 and the newly formed vehicular micro clouds 620, as well as the vehicle members 602 are able to collaborate and exchange information. As such the cloud leader 604 of the existing vehicular micro cloud 120 can send updates about the vehicle collision and access at the intersection to the newly formed vehicular micro clouds 620.

Figure 7A:
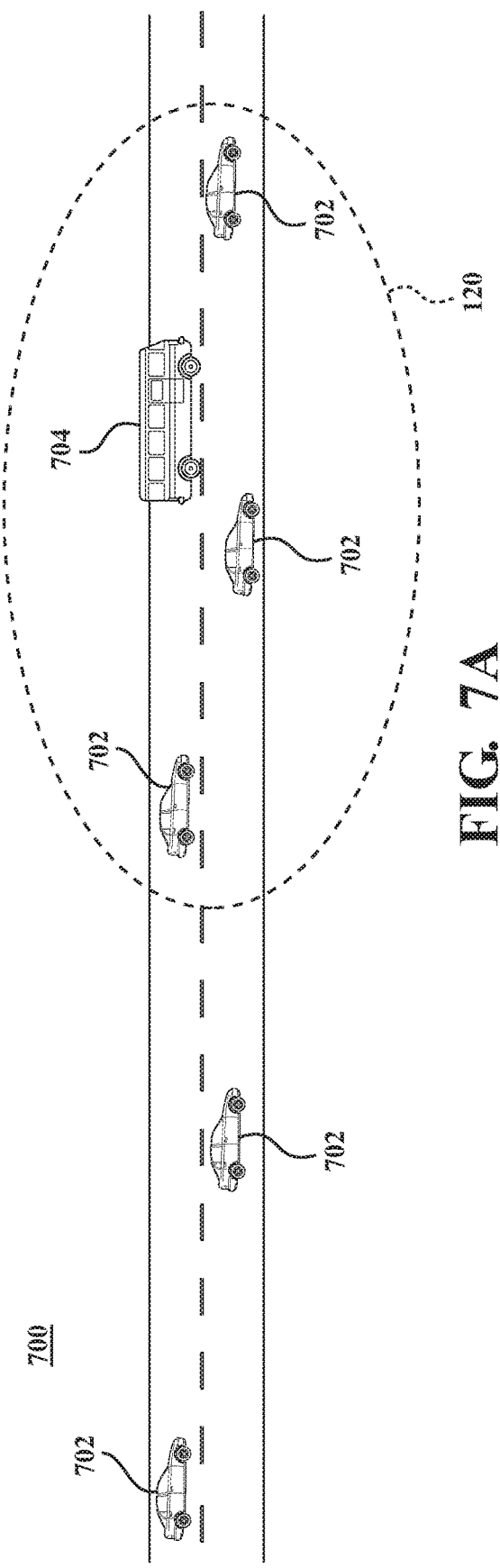
FIG. 7A is another example of a dynamic vehicular micro cloud adjustment scenario with an existing vehicular micro cloud.
Figure 7B:
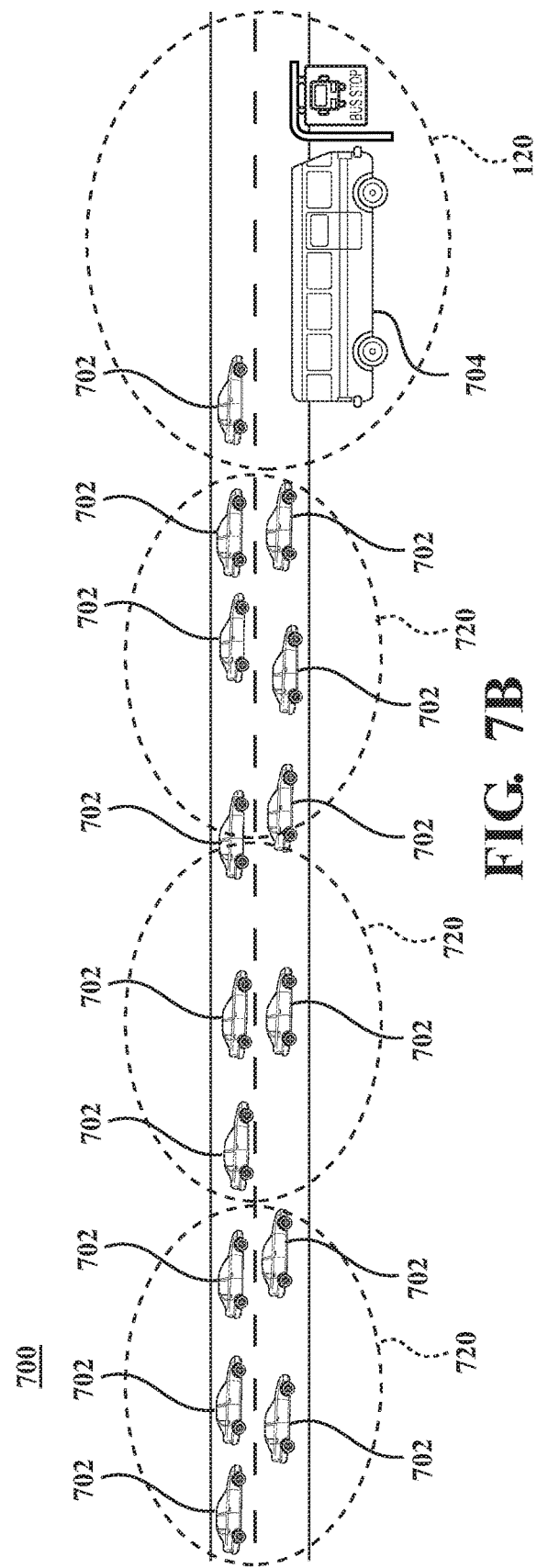
FIG. 7B is another example of the dynamic vehicular micro cloud adjustment scenario where the properties of the existing vehicular micro cloud have been adjusted.

A second non-limiting example of the operation of the vehicular micro cloud adjustment system 270 and/or one or more of the methods will now be described in relation to FIGS. 7A-7B. FIGS. 7A-7B show another example of a dynamic vehicular micro cloud adjustment scenario 700.

In FIG. 7A, a mobile vehicular micro cloud 120 can exist around a mass transportation vehicle such as a commuter vehicle. Connected vehicles travelling proximate to the existing vehicular micro cloud 120 and the commuter vehicle 704 can join and/or exit the existing vehicular micro cloud 120. The commuter vehicle 704 can share similarities with vehicle 102. The commuter vehicle 704 can be a cloud leader 104 in the existing vehicular micro cloud 120, as the commuter vehicle 704 travels along a road. The commuter vehicle 704 can be large and as such a driver of the commuter vehicle 704 may have multiple blind spots. As such, the commuter vehicle 704 can be a vehicular micro cloud member so as to share information with other vehicular micro cloud members in order to remain safe and provide a smooth and comfortable ride for passengers in the commuter vehicle 704. In this example, the existing vehicular micro cloud 120 can have the following properties, comfort as the priority type, mobile as the mobility type, independent as the dependency type, on-demand as the origin type, ad-hoc as the communication type, traffic flow as the reason, promote travel comfort as the collaboration objective, and maximize travel comfort as the optimization method.

The vehicular micro cloud adjustment system 270, or more specifically, the environment parameter determination module 320 can determine one or more parameters of the environment around the commuter vehicle 704 and the vehicles 702 proximate to the commuter vehicle 704. As shown in FIG. 7B, the commuter vehicle 704 can stop to drop off and/or pick up one or more passengers. The environment parameter determination module 320 can receive information about the environment from, as an example, the commuter vehicle 704. In such a case and as an example, the environment parameter determination module 320 can receive information from the commuter vehicle sensors, indicating that the commuter vehicle 704 has stopped, and as such, can determine that the commuter vehicle 704 has stopped.

The vehicular micro cloud adjustment system 270, or more specifically, the impact identification module 330 can identify an impact of the parameters of the environment on the vehicle(s) 702 associated with the existing vehicular micro cloud 120. In other words, the impact identification module 330 can identify the impact of the parameters of the environment on the vehicles 702 approaching the stopped commuter vehicle 704. The impact identification module 330 can determine that the impact can be traffic congestion based on the commuter vehicle 704 being stopped and blocking traffic, and the number of vehicles 702 travelling on the road towards the commuter vehicle 704. The impact identification module 330 can further determine that traffic congestion can increase the risk of a collision. As previously mentioned, the impact identification module 330 can use any suitable algorithm to determine the impact of the stopped commuter vehicle 704 on the vehicles 702 in the environment.

The vehicular micro cloud adjustment system 270, or more specifically the vehicular micro cloud update module 340 can identify one or more properties of the existing vehicular micro cloud 120. The vehicular micro cloud update module 340 can identify the properties by requesting the information from, as an example, the cloud leader. The vehicular micro cloud adjustment system 270, or more specifically the vehicular micro cloud update module 340 can determine which adjustment to the one or more properties of the existing vehicular micro cloud 120 can address the impact. In this case, the impact is traffic congestion which can lead to safety risks such as a risk of a collision between vehicles or a collision between a vehicle and a passenger boarding or deboarding the commuter vehicle. As previously mentioned, the vehicular micro cloud update module 340 can determine the properties that a vehicular micro cloud 120 can have to assist vehicles travelling through the environment. In this example, the vehicular micro cloud update module 340 can determine the following properties—safety as the priority type, stationary as the mobility type, interdependent as the dependency type, on-demand as the origin type, ad-hoc as the communication type, stopped commuter vehicle as the reason, improve environment awareness as the collaboration objective, and minimize safety risk as the optimization method.

The vehicular micro cloud adjustment system 270, or more specifically the vehicular micro cloud update module 340 can compare the original reason and the new reason. In this case, the vehicular micro cloud update module 340 can compare the original reason, which is safety and comfort for a mobile commuter vehicle with the new reason, which is safety around a stopped commuter vehicle 704, and can determine that the original reason and the new reason are different. In response to determining that the original reason and the new reason are different, the vehicular micro cloud update module 340 can update the properties of the existing cloud by transmitting a message to the cloud leader, which is the commuter vehicle 704 in this case, to adjust the properties of the vehicular micro cloud 120. In response to receiving the message, the commuter vehicle 704 can adjust the mobility type of the vehicular micro cloud 120 from mobile to stationary. In this example, an approaching vehicle 702 near the commuter vehicle 704 can detect that there is a stopped commuter vehicle 704 using vehicle sensors 221. The approaching vehicle 702 can instruct other approaching vehicles to form vehicular micro clouds 720 that are interdependent. When the approaching vehicles form interdependent vehicular micro clouds 720 and the existing vehicular micro cloud 120 adjusts from an independent dependency type to an interdependent dependency type, the existing vehicular micro cloud 120 and the newly formed vehicular micro clouds 720, as well as the vehicle members 702 are able to collaborate and exchange information. As such the commuter vehicle 704 of the existing vehicular micro cloud 120 can send updates about the location of the commuter vehicle 704 and how long the commuter vehicle 704 intends to be stopped to the newly formed vehicular micro clouds 720.

It will be appreciated that arrangements described herein can provide numerous benefits, including one or more of the benefits mentioned herein. For example, arrangements described herein can result in sharing resources between vehicular micro cloud members to address events occurring in the surrounding environment.

FIG. 2 will now be discussed in full detail as an example environment within which the system and methods disclosed herein may operate. In some instances, the connected vehicle 102 can be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the connected vehicle 102 can be a conventional vehicle that is configured to operate in only a manual mode.

In one or more embodiments, the connected vehicle 102 can be an autonomous vehicle, a semi-autonomous vehicle, and/or a manual vehicle. As used herein, "autonomous vehicle" refers to a vehicle that operates in an autonomous mode. "Autonomous mode" refers to navigating and/or maneuvering the connected vehicle 102 along a travel route using one or more computing systems to control the connected vehicle 102 with minimal or no input from a human driver. In one or more embodiments, the connected vehicle 102 is highly automated or completely automated. In one embodiment, the connected vehicle 102 is configured with one or more semi-autonomous operational modes in which one or more computing systems perform a portion of the navigation and/or maneuvering of the connected vehicle 102 along a travel route, and a vehicle operator (i.e., driver) provides inputs to the connected vehicle 102 to perform a portion of the navigation and/or maneuvering of the connected vehicle 102 along a travel route.

The connected vehicle 102 can include one or more processors 210. In one or more arrangements, the processor(s) 210 can be a main processor of the connected vehicle 102. For instance, the processor(s) 210 can be an electronic control unit (ECU). The connected vehicle 102 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360-degree ground views. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360-degree ground views. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

In one or more arrangements, the map data 216 can include one or more terrain maps 217. The terrain map(s) 217 can include information about the ground, terrain, roads, surfaces, and/or other features of one or more geographic areas. The terrain map(s) 217 can include elevation data in the one or more geographic areas. The map data 216 can be high quality and/or highly detailed. The terrain map(s) 217 can define one or more ground surfaces, which can include paved roads, unpaved roads, land, and other things that define a ground surface.

In one or more arrangements, the map data 216 can include one or more static obstacle maps 218. The static obstacle map(s) 218 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 218 can have location data, size data, dimension data, material data, and/or other data associated with it. The static obstacle map(s) 218 can include measurements, dimensions, distances, and/or information for one or more static obstacles. The static obstacle map(s) 218 can be high quality and/or highly detailed. The static obstacle map(s) 218 can be updated to reflect changes within a mapped area.

The one or more data stores 215 can include sensor data 219. In this context, "sensor data" means any information about the sensors that the connected vehicle 102 is equipped with, including the capabilities and other information about such sensors. As will be explained below, the connected vehicle 102 can include the sensor system 220. The sensor data 219 can relate to one or more sensors of the sensor system 220. As an example, in one or more arrangements, the sensor data 219 can include information on one or more LIDAR sensors 224 of the sensor system 220.

In some instances, at least a portion of the map data 216 and/or the sensor data 219 can be located in one or more data stores 215 located onboard the connected vehicle 102. Alternatively, or in addition, at least a portion of the map data 216 and/or the sensor data 219 can be located in one or more data stores 215 that are located remotely from the connected vehicle 102.

As noted above, the connected vehicle 102 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processor(s) 210, the data store(s) 215, and/or another element of the connected vehicle 102 (including any of the elements shown in FIG. 2). The sensor system 220 can acquire data of at least a portion of the external environment of the connected vehicle 102 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the connected vehicle 102 itself. In one or more arrangements, the vehicle sensor(s) 221 can be configured to detect, and/or sense position and orientation changes of the connected vehicle 102, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the connected vehicle 102. In one or more arrangements, the vehicle sensor(s) 221 can include a speedometer to determine a current speed of the connected vehicle 102.

Alternatively, or in addition, the sensor system 220 can include one or more environment sensors 222 configured to acquire, and/or sense driving environment data. "Driving environment data" includes data or information about the external environment in which the vehicle is located or one or more portions thereof. For example, the one or more environment sensors 222 can be configured to detect, quantify and/or sense obstacles in at least a portion of the external environment of the connected vehicle 102 and/or information/data about such obstacles. Such obstacles may be stationary objects and/or dynamic objects. The one or more environment sensors 222 can be configured to detect, measure, quantify and/or sense other objects in the external environment of the connected vehicle 102, such as, for example, lane markers, signs, traffic lights, traffic signs, lane lines, crosswalks, curbs proximate the connected vehicle 102, off-road objects, electronic roadside devices, etc. The one or more environment sensors 222 can be configured to determine whether the objects with electronic capability are functional by wirelessly transmitting messages to and receiving messages from the objects.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 can include one or more radar sensors 223, one or more LIDAR sensors 224, one or more sonar sensors 225, one or more cameras 226, and/or one or more communication sensors 227. In one or more arrangements, the one or more cameras 226 can be high dynamic range (HDR) cameras or infrared (IR) cameras. The communication sensor(s) 227 such as radio frequency identification (RFID) and near-field communication (NFC) readers may communicate with electronic objects such as RFID and/or NFC tags in the environment using any suitable means of communication such as Wi-Fi, Bluetooth, vehicle-to-infrastructure (V2I) wireless communication, V2X wireless communication, RFIC, and NFC.

The connected vehicle 102 can include an input system 230. An "input system" includes any device, component, system, element or arrangement or groups thereof that enable information/data to be entered into a machine. The input system 230 can receive an input from a vehicle passenger (e.g., a driver or a passenger). The connected vehicle 102 can include an output system 235. An "output system" includes any device, component, or arrangement or groups thereof that enable information/data to be presented to a vehicle passenger (e.g., a person, a vehicle passenger, etc.).

The connected vehicle 102 can include one or more transceivers 280. As used herein, "transceiver" is defined as a component or a group of components that transmit signals, receive signals or transmit and receive signals, whether wirelessly or through a hard-wired connection. The transceiver(s) 280 can enable communications between the connected vehicle 102 and other elements of the DVMCA system 100 including other connected vehicles 102. The transceiver(s) 280 can be any suitable transceivers used to access a network, access point, node or other device for the transmission and receipt of data. The transceiver(s) 280 may be wireless transceivers using any one of a number of wireless technologies, now known or in the future.

The connected vehicle 102 can include one or more vehicle systems 240. Various examples of the one or more vehicle systems 240 are shown in FIG. 2. However, the connected vehicle 102 can include more, fewer, or different vehicle systems. It should be appreciated that although particular vehicle systems are separately defined, each or any of the systems or portions thereof may be otherwise combined or segregated via hardware and/or software within the connected vehicle 102. The connected vehicle 102 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the connected vehicle 102 and/or to determine a travel route for the connected vehicle 102. The navigation system 247 can include one or more mapping applications to determine a travel route for the connected vehicle 102. The navigation system 247 can include a global positioning system, a local positioning system or a geolocation system.

The processor(s) 210, the vehicular micro cloud adjustment system 270, and/or the autonomous driving module(s) 260 can be operatively connected to communicate with the various vehicle systems 240 and/or individual components thereof. For example, returning to FIG. 2, the processor(s) 210 and/or the autonomous driving module(s) 260 can be in communication to send and/or receive information from the various vehicle systems 240 to control the movement, speed, maneuvering, heading, direction, etc. of the connected vehicle 102. The processor(s) 210, the vehicular micro cloud adjustment system 270, and/or the autonomous driving module(s) 260 may control some or all of these vehicle systems 240 and, thus, may be partially or fully autonomous.

The processor(s) 210, the vehicular micro cloud adjustment system 270, and/or the autonomous driving module(s) 260 can be operatively connected to communicate with the various vehicle systems 240 and/or individual components thereof. For example, returning to FIG. 2, the processor(s) 210, the vehicular micro cloud adjustment system 270, and/or the autonomous driving module(s) 260 can be in communication to send and/or receive information from the various vehicle systems 240 to control the movement, speed, maneuvering, heading, direction, etc. of the connected vehicle 102. The processor(s) 210, the vehicular micro cloud adjustment system 270, and/or the autonomous driving module(s) 260 may control some or all of these vehicle systems 240.

The processor(s) 210, the vehicular micro cloud adjustment system 270, and/or the autonomous driving module(s) 260 may be operable to control the navigation and/or maneuvering of the connected vehicle 102 by controlling one or more of the vehicle systems 240 and/or components thereof. For instance, when operating in an autonomous mode, the processor(s) 210, the vehicular micro cloud adjustment system 270, and/or the autonomous driving module(s) 260 can control the direction and/or speed of the connected vehicle 102. The processor(s) 210, the vehicular micro cloud adjustment system 270, and/or the autonomous driving module(s) 260 can cause the connected vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The connected vehicle 102 can include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving module(s) 260. Any suitable actuator can be used. For instance, the one or more actuators 250 can include motors, pneumatic actuators, hydraulic pistons, relays, solenoids, and/or piezoelectric actuators, just to name a few possibilities.

The connected vehicle 102 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The connected vehicle 102 can include one or more autonomous driving modules 260. The autonomous driving module(s) 260 can be configured to receive data from the sensor system 220 and/or any other type of system capable of capturing information relating to the connected vehicle 102 and/or the external environment of the connected vehicle 102. In one or more arrangements, the autonomous driving module(s) 260 can use such data to generate one or more driving scene models. The autonomous driving module(s) 260 can determine position and velocity of the connected vehicle 102. The autonomous driving module(s) 260 can determine the location of obstacles, obstacles, or other environmental features including traffic signs, trees, shrubs, neighboring vehicles, pedestrians, etc.

The autonomous driving module(s) 260 can be configured to receive, and/or determine location information for obstacles within the external environment of the connected vehicle 102 for use by the processor(s) 210, and/or one or more of the modules described herein to estimate position and orientation of the connected vehicle 102, vehicle position in global coordinates based on signals from a plurality of satellites, or any other data and/or signals that could be used to determine the current state of the connected vehicle 102 or determine the position of the connected vehicle 102 with respect to its environment for use in either creating a map or determining the position of the connected vehicle 102 in respect to map data.

The autonomous driving module(s) 260 either independently or in combination with the vehicular micro cloud adjustment system 270 can be configured to determine travel path(s), current autonomous driving maneuvers for the connected vehicle 102, future autonomous driving maneuvers and/or modifications to current autonomous driving maneuvers based on data acquired by the sensor system 220, driving scene models, and/or data from any other suitable source such as determinations from the sensor data 219. "Driving maneuver" means one or more actions that affect the movement of a vehicle. Examples of driving maneuvers include: accelerating, decelerating, braking, turning, moving in a lateral direction of the connected vehicle 102, changing travel lanes, merging into a travel lane, and/or reversing, just to name a few possibilities. The autonomous driving module(s) 260 can be configured to implement determined driving maneuvers. The autonomous driving module(s) 260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 260 can be configured to execute various vehicle functions and/or to transmit data to, receive data from, interact with, and/or control the connected vehicle 102 or one or more systems thereof (e.g., one or more of vehicle systems 240).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for dynamically updating an existing vehicular micro cloud, the method comprising:
   determining one or more parameters of an environment around a plurality of vehicles;
   identifying an impact of the one or more parameters of the environment on one or more of the plurality of vehicles associated with the existing vehicular micro cloud;
   identifying an original reason for the existing vehicular micro cloud;
   determining whether one or more properties associated with the original reason for the existing vehicular micro cloud can address the impact; and
   updating the one or more properties based on the determination, the one or more properties including at least one of a priority, a mobility type, a dependency type, a communication category, or a collaboration criteria.

2. The method of claim 1, wherein the determining the one or more parameters of the environment around the plurality of the vehicles includes monitoring the environment.

3. The method of claim 1, wherein the one or more properties include a priority, and wherein the determining which adjustment to the one or more properties of the existing vehicular micro cloud can address the impact further includes at least one of determining whether an adjustment of the priority to safety, comfort, or time management can address the impact.

4. The method of claim 1, wherein the one or more properties include a mobility type, and wherein the determining which adjustment to the one or more properties of the existing vehicular micro cloud can address the impact further includes at least one of determining whether an adjustment of the mobility type to mobile or to stationary can address the impact.

5. The method of claim 1, wherein the one or more properties include a dependency type, and wherein the determining which adjustment to the one or more properties of the existing vehicular micro cloud can address the impact further includes at least one of determining whether an adjustment of the dependency type to independent or to interdependent can address the impact.

6. The method of claim 1, wherein the one or more properties include a communication category, and wherein the determining which adjustment to the one or more properties of the existing vehicular micro cloud can address the impact further includes at least one of determining whether an adjustment of the communication category to an ad-hoc communication or a hybrid communication can address the impact.

7. The method of claim 1, wherein the one or more properties include a collaboration criteria, wherein the collaboration criteria includes at least one of an objective function and an optimization method, and wherein the determining which adjustment to the one or more properties of the existing vehicular micro cloud can address the impact further includes at least one of determining whether an adjustment of the objective function or the optimization method can address the impact.

8. The method of claim 1, wherein the existing vehicular micro cloud communicates with one or more other vehicular micro clouds, forming a vehicular macro cloud.

9. A method for dynamically updating an existing vehicular micro cloud, the method comprising:
   determining one or more parameters of an environment around a plurality of vehicles;
   identifying an impact of the one or more parameters of the environment on one or more of the plurality of vehicles associated with the existing vehicular micro cloud;
   identifying one or more properties of the existing vehicular micro cloud;
   determining which adjustment to the one or more properties of the existing vehicular micro cloud can address the impact, wherein the determining which adjustment to the one or more properties of the existing vehicular micro cloud can address the impact further includes:
      identifying an original reason for the existing vehicular micro cloud;
      identifying a new reason for the existing vehicular micro cloud based on the one or more parameters;
      determining that the original reason and the new reason are different; and
      in response to determining that the original reason and the new reason are different, determining which adjustment to the one or more properties of the existing vehicular micro cloud can address the impact based on the new reason; and
   updating the one or more properties based on the determination.

10. The method of claim 9, wherein the original reason is based on one of traffic flow, traffic density, a vehicle accident, a road closure, an unusual event, and a risk, and wherein the new reason is based on one of traffic flow, traffic density, a vehicle accident, a road closure, an unusual event, and a risk.

11. A system for dynamically updating an existing vehicular micro cloud, the system comprising:
   one or more processors; and
   a memory in communication with the one or more processors, the memory including:
      an environment parameter determination module including instructions that when executed by the one or more processors cause the one or more processors to determine one or more parameters of an environment around a plurality of vehicles;
      an impact identification module including instructions that when executed by the one or more processors cause the one or more processors to identify an impact of the one or more parameters of the environment on one or more of the plurality of vehicles associated with the existing vehicular micro cloud; and
      a vehicular micro cloud update module including instructions that when executed by the one or more processors cause the one or more processors to:
         identify an original reason for the existing vehicular micro cloud;
         determine whether one or more properties associated with the original reason for the existing vehicular micro cloud can address the impact; and
         update the one or more properties based on the determination.

12. The system of claim 11, wherein the environment parameter determination module further includes instructions that when executed by the one or more processors cause the one or more processors to monitor the environment.

13. The system of claim 11, wherein the one or more properties include a priority, and wherein the determining which adjustment to the one or more properties of the existing vehicular micro cloud can address the impact further includes at least one of determining whether an adjustment of the priority to safety, comfort, or time management can address the impact.

14. The system of claim 11, wherein the one or more properties include a mobility type, and wherein the determining which adjustment to the one or more properties of the existing vehicular micro cloud can address the impact further includes at least one of determining whether an adjustment of the mobility type to mobile or to stationary can address the impact.

15. The system of claim 11, wherein the one or more properties include a dependency type, and wherein the determining which adjustment to the one or more properties of the existing vehicular micro cloud can address the impact further includes at least one of determining whether an adjustment of the dependency type to independent or to interdependent can address the impact.

16. The system of claim 11, wherein the one or more properties include a communication category, and wherein the determining which adjustment to the one or more properties of the existing vehicular micro cloud can address the impact further includes at least one of determining whether an adjustment of the communication category to an ad-hoc communication or a hybrid communication can address the impact.

17. The system of claim 11, wherein the one or more properties include a collaboration criteria, wherein the collaboration criteria includes at least one of an objective function and an optimization method, and wherein the determining which adjustment to the one or more properties of the existing vehicular micro cloud can address the impact further includes at least one of determining whether an adjustment of the objective function or the optimization method can address the impact.

18. The system of claim 11, wherein the existing vehicular micro cloud communicates with one or more other vehicular micro clouds, forming a vehicular macro cloud.

19. A system for dynamically updating an existing vehicular micro cloud, the system comprising:
one or more processors; and
a memory in communication with the one or more processors, the memory including:
an environment parameter determination module including instructions that when executed by the one or more processors cause the one or more processors to determine one or more parameters of an environment around a plurality of vehicles;
an impact identification module including instructions that when executed by the one or more processors cause the one or more processors to identify an impact of the one or more parameters of the environment on one or more of the plurality of vehicles associated with the existing vehicular micro cloud; and
a vehicular micro cloud update module including instructions that when executed by the one or more processors cause the one or more processors to:
identify one or more properties of the existing vehicular micro cloud;
determine which adjustment to the one or more properties of the existing vehicular micro cloud can address the impact; wherein the vehicular micro cloud update module further includes instructions that when executed by the one or more processors cause the one or more processors to:
identify an original reason for the existing vehicular micro cloud;
identify a new reason for the existing vehicular micro cloud based on the one or more parameters of the environment;
determine that the original reason and the new reason are different; and
in response to determining that the original reason and the new reason are different, determine which adjustment to the one or more properties of the existing vehicular micro cloud can address the impact based on the new reason; and
update the one or more properties based on the determination.

20. The system of claim 19, wherein the original reason is based on one of traffic flow, traffic density, a vehicle accident, a road closure, an unusual event, and a risk, and wherein the new reason is based on one of traffic flow, traffic density, a vehicle accident, a road closure, an unusual event, and a risk.

* * * * *